United States Patent

[11] 3,609,599

[72] Inventor Robert Dean Standley
Shrewsbury, N.J.

[21] Appl. No. 20,598
[22] Filed Mar. 18, 1970
[45] Patented Sept. 28, 1971

[73] Assignee Bell Telephone Laboratories, Inc.
Murray Hill, N.J.

[54] TIME DELAY EQUALIZER UTILIZING A PLURALITY OF CASCADED DIRECTIONAL FILTERS
5 Claims, 6 Drawing Figs.

[52] U.S. Cl. .......... 333/28 R, 333/73 R
[51] Int. Cl. .......... H03h 7/14
[50] Field of Search .......... 333/10, 28, 73, 73 S, 73 W, 73 C

[56] References Cited

UNITED STATES PATENTS

| | | | |
|---|---|---|---|
| 2,922,123 | 1/1960 | Cohn .......... | 333/10 |
| 3,514,722 | 5/1970 | Cappucci .......... | 333/10 |

*Primary Examiner*—Eli Lieberman
*Assistant Examiner*—Paul L. Gensler
*Attorneys*—R. J. Guenther and Arthur J. Torsiglieri

ABSTRACT: This application discloses a microwave delay equalizer which utilizes a cascade of directional filters interconnected by delay networks. Control of the delay characteristic is achieved by appropriately selecting the center frequencies and response characteristics of the filters and the delay times of the interconnecting delay networks.

PATENTED SEP 28 1971 3,609,599

SHEET 1 OF 2

INVENTOR
R. D. STANDLEY
BY
Sylvan Sherman
ATTORNEY

TIME DELAY EQUALIZER UTILIZING A PLURALITY OF CASCADED DIRECTIONAL FILTERS

This invention relates to broadband electromagnetic wave transmission systems and more specifically to time delay equalizers for use in such systems.

Background of the Invention

As is well know, electromagnetic waves of different frequencies experience different time delays when transmitted through a transmission system. For example, when a broadband microwave signal is transmitted through a waveguide, the lower frequency components are delayed to a greater extent than the higher frequency components. If uncorrected, this difference in time delay gives rise to appreciable and, in some cases, serious distortion of the signal. The resultant distortion deemed "time delay distortion," can be corrected by suitably delaying the higher frequency components with respect to the lower frequency components.

Delay equalizers for performing this function at high frequencies have, in may instances, consisted of specially designed waveguides. (See, for example, U.S. Pat. Nos. 2,863,126and 3,253,238.) In equalizers of this type, fabrication of the waveguide structure has often proved unmanageable and costly. Secondly, such equalizers are often large and, as a result, space consuming.

It is, therefore, a broad object of the present invention to provide a time delay equalizer which is compact in structure and which can be easily fabricated.

It is a further object of the present invention to provide a microwave delay equalizer that can be constructed from strip lines or microwave integrated circuits.

SUMMARY OF THE INVENTION

In accordance with the principles of the present invention, the above objects are accomplished by utilizing a network of four port microwave directional filters to achieve delay equalization. More particularly, the directional filters, each having a different center frequency, are interconnected on cascade by means of delay networks which provide predetermined time delays. As a broadband microwave signal propagates through the equalizer, each filter directs a preselected band of frequencies of the signal toward the output port of the equalizer network, while the rest of the frequency components are coupled to the next adjacent filter in the cascade. In general, the frequency components having a previously shorter delay travel through a greater number of filters and interconnecting delay lines than the frequency components having a previously longer delay before being directed toward the output. As a result, the frequency components having a previously shorter have a longer round trip transmission path through the equalizer, and a correspondingly greater delay time. Accordingly, a signal having any arbitrary delay-vs.-frequency characteristic can be equalized.

DESCRIPTION OF THE DRAWINGS

The above-mentioned and other features and objects of this invention will become more apparent by reference to the following description taken in conjunction with the accompanying drawings, in which.

DETAILED DESCRIPTION

Figure 1:
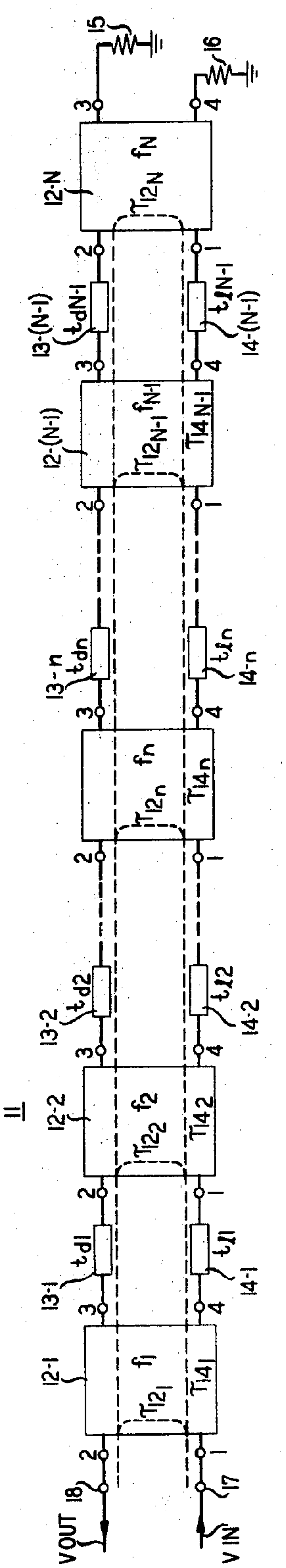
FIG. 1 is a block diagram of a delay equalizer in accordance with the principles of the invention.

FIG. 1 shows, in block diagram, a time delay equalizer 11 in accordance with the present invention, comprising a plurality of cascaded directional filters 12–1 to 12–N. Each of the filters 12 is a four port device having two pairs of conjugate ports 1–3 and 2–4, wherein wave energy coupled to one port of one pair of conjugate ports will divide, in some prescribed manner, between the other pair of conjugate ports, with no wave energy being coupled to the conjugate of said one port.

Figure 2:
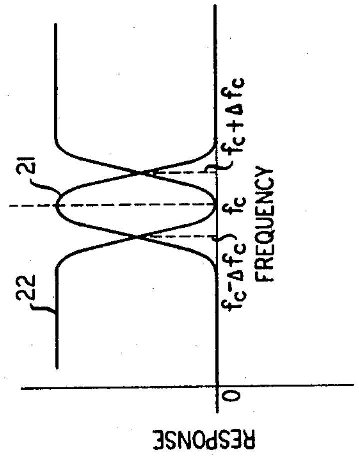
FIG. 2 is a graphical representation of a typical response characteristic of the directional filters employed in the equalizer of FIG. 1.

The particular manner in which the wave energy divides between the respective ports of any filter is determined by the response characteristic of the particular filter. For example, in accordance with the present invention, the response characteristic of each filter, as illustrated in FIG. 2, is defined by two curves. The first of these curves, curve 21, has a band-pass characteristic and defined the coupling between ports 1 and 2, and between ports 3 and 4. The second of these curves, curve 22, has a band reject characteristic and defines the transmission between ports 1 and 4, and between ports 2 and 3. Both the passband defined by curve 21 and the rejection band defined by curve 22 are symmetric about the nominal filter frequency $f_c$.

It is noted from these curves that essentially all the energy within the band $f_c \pm \Delta f_c$ is coupled from port 1 to port 2, whereas all the energy outside this band is transmitted from port 1 to port 4. Similarly, all the energy outside the band is transmitted from port 3 to port 2.

Directional filters 12 are connected in cascade by parallel pairs of delay networks 13–1 to 13–(N-1) and 14–1 to 14–(N-1) which provide substantially constant delays $t_{d_1}$ to $t_{d_{N-1}}$ and $t_{l_1}$ to $t_{l_{N-1}}$, respectively. More specifically, each of the delay networks 13 connects port 3 of a preceding filter to port 2 of the next adjacent filter, while each of the delay networks 14 connects port 4 of a preceding filter to port 1 of the next adjacent filter. Ports 3 and 4 of the $N^{th}$ filter are match-terminated by resistors 15 and 16, respectively. Signals are introduced into the equalizer through input port 17, which is coupled to port 1 of the first filter 12–1, and are extracted from output port 18, which is coupled to port 2 of the first filter.

Delay networks 13 and 14 can be delay lines or any of the well-known networks capable of providing the requisite delay. Filters 12 can typically be of the loop type described by F. S. Coale in an article entitled, "A Traveling-Wave Directional Filter," *IRE Trans.*, Vol. MTT–4, pp. 256–260; Oct. 1956.

In the illustrative embodiment shown, directional filters 12 of equalizer 11 have different resonant or center frequencies $f_1$ to $f_N$, such that $f_1 < f_2 < \cdot \cdot < f_{N-1} < f_N$. In addition, the center frequencies $f_1$ and $f_N$ and the bandwidths of the filters are selected such that the total frequency band they define is substantially equivalent to the frequency band over which time delay equalization is required.

Figure 3:
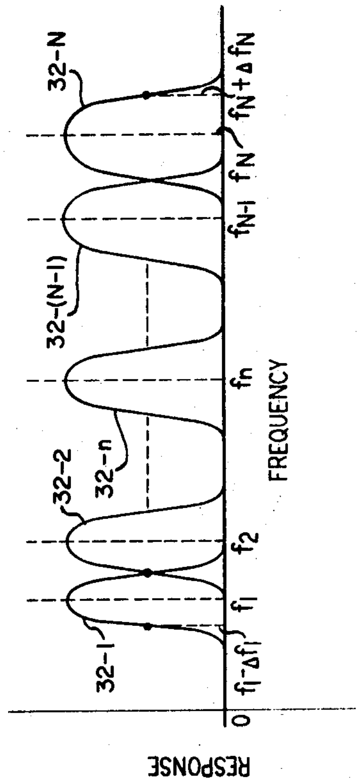
FIG. 3 is a graphical representation defining the portions of wave energy coupled between ports 1 and 2 of each of the filters of FIG. 1.

In FIG. 3, curves 32–1 to 32–N, centered at frequencies $f_1$. . . $f_N$, respectively, define that portion of the incident wave energy coupled between ports 1 and 2 of filters 12–1 to 12–N, respectively. Each curve encompasses a specific band of frequencies which is a function of the center frequency and Q of its corresponding filter. In the instant embodiment, it is assumed that the Q's of the filters 12 are substantially equal. Thus, as illustrated, each of the curves 32 covers correspondingly more bandwidth than the preceding curve. Also, the center frequencies $f_1$ to $f_N$ are such that adjacent curves overlap at about their half power points. Hence, as shown, curves 32–1 to 32–N encompass the total band of frequencies between $f_1 - \Delta f_1$ and $f_N + \Delta f_N$.

Figure 4:
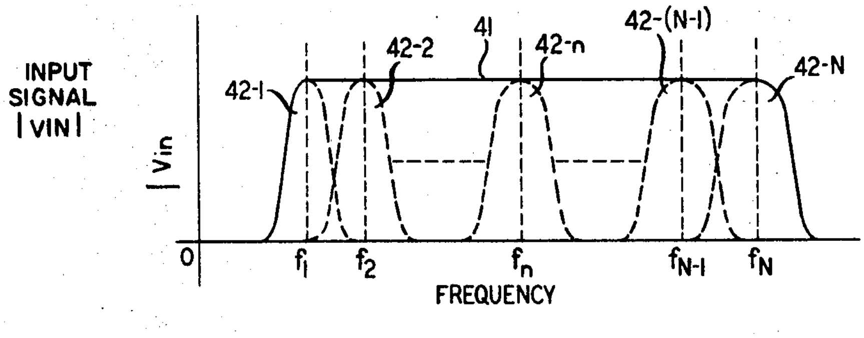
FIG. 4 illustrates the frequency spectrum of a signal introduced into the equalizer of FIG. 1.

In operation, a broadband microwave signal $V_{in}$ is applied to equalizer input port 17. It is assumed that $V_{in}$ has a frequency spectrum $|V_{in}(f)|$ illustrated by curve 41 in FIG. 4, and a time delay characteristic illustrated by curve 51 in FIG. 5. For the purposes of discussion, the spectrum $|V_{in}(f)|$ is assumed to be divided into N frequency bands 42–1 to 42–N, where each band is coextensive with one of the response curves of FIG. 3. Thus, as shown, frequency band 42–1 encompasses frequencies within curve 32–1, frequency band 42–1 within curve 32–2, etc.

Time delay characteristic 51 is a typical delay characteristic which may have resulted from passage of $V_{in}$ through a waveguide. As shown, the lower frequency components of $V_{in}$ have been delayed to a greater extent than the higher frequency components. Accordingly, it is required that upon passage through equalizer 11 the higher frequency components be delayed to a greater extent than the lower frequency components, thereby producing an output signal of uniform delay over the frequency band of interest.

Since, as above-mentioned, the higher frequency components of $V_{in}$ have been delayed to a lesser degree than the lower frequency components, the signal components within frequency band 42–N are first to enter port 1 of the first filter. Since these components fall outside of the band defined by curve 32–1 of filter 12–1, they are transmitted to port 4 of the filter. From port 4 of filter 12–1, the components are coupled through delay network 14–1 to port 1 of filter 12–2. Since the components are similarly outside the frequency band defined by curve 32–2, they are transmitted to port 4 of the filter, and from port 4 through delay network 14–2. In a similar manner, the components within frequency band 42–N are transmitted from delay network 14–2 through subsequent filter sections and delay networks until they arrive at port 1 of the last filter 12–N. At this last filter, the signal components are now within the band defined by curve 32–N, and, therefore, are coupled to port 2 of the filter. From port 2 of the latter the signal components are transmitted to delay network 13–(N-1), and from this delay network back through filters 12–(N-1) to 12–1, going from port 3 to port 2 of each filter, and passing through the connecting delay networks 13–(N-1) to 13–1. Hence, upon arrival at output port 18 of equalizer 11, the components in band 42–N have been delayed an average time $T_N$, where $T_N$ is as is shown is FIG. 5. In terms of the filters 12 and delay networks 13 and 14, $T_N$ is given as $$T_N \tau_{12_N} + \sum_{K=1}^{N-1} (t_{1_k} + \tau_{14_K}) + \sum_{K=1}^{N-1} (t_{d_k} + \tau_{32_K})$$

where $\tau_{12_N}$ is the average time delay between ports 1 and 2 of filter 12–N; $t_{1_k}$ is the average delay through delay network 13–K; $\tau_{14_K}$ is the average delay between port 1 and port 4 of filter 12–K; $t_{d_k}$ is the average delay through delay network 14–K; and $\tau_{32_K}$ is the average delay between port 3 and port 2 of filter 12–K.

Assuming, for the purposes of discussion, that $t_{1_k} = t_{d_k}$ and noting that for any one of the filters 12, $\tau_{14_K} = \tau_{32_K}$ the above equation for $T_N$ reduces to $$T_N = \tau_{12_N} + 2 \sum_{K=1}^{N-1} (t_{1_k} + \tau_{14_K}) \quad (1)$$

Figure 5:
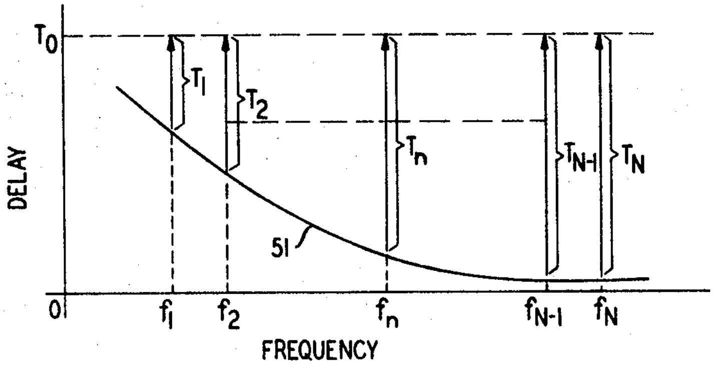
FIG. 5 is illustrative of the time delay characteristic of the signal of FIG. 4.

The next group of input signal frequency components to enter port 17 of equalizer 11, are those within frequency band 42–(N-1). These components are transmitted through the equalizer in a similar manner as the frequency components in band 42–N. However, since these signal components lie within curve 32–(N-1), they are transmitted through the equalizer, from port 1 to port 4 of each of the filters 12, only as far as filter 12 –(N-1). At this point, they are coupled to port 2 of filter 12–(N-1). From port 2 of the latter, they are transmitted toward output port 18 traversing the same path as traversed by the previous components in band 42–N. Upon reaching port 18, therefore, the components in band 42–(N-1) have been delayed an average time $T_{N-1}$, as shown in FIG. 5 where $T_{N-1}$ is given as $$T_{N-1} = \tau_{12_{N-1}} + 2 \sum_{K=1}^{N-2} (t_{1_k} + \tau_{14_k}) \quad (2)$$

The remaining input signal components within frequency bands 42–(N-2) to 42–1 are transmitted through equalizer in a similar manner as average component in bands 42–(N-1) and 42–N. Thus, each of the remaining input signal components is transmitted through the equalizer, from port 1 to port 4 of each of the filters 12, until it arrives at port 1 of the filter whose response curve 32 is coextensive with the frequency band in which it lies. At this point, it is coupled to port 2 of the latter filter, and from this port transmitted back toward equalizer output port 18. Accordingly, upon arrival at output port 18, the frequency components in bands 42–(N-2) to 42–1 have received average delays $T_{N-2}$ to $T_1$, respectively, as shown in FIG. 5, where the delays are given as $$T_{N-2} = \tau_{12_{N-2}} + 2 \sum_{K=1}^{N-3} (t_{1_k} + \tau_{14_k}) \quad (3)$$

$$T_{N-3} = \tau_{12_{N-3}} + 2 \sum_{K=1}^{N-4} (t_{1_k} + \tau_{14_k}) \quad (4)$$

$$\vdots \qquad \qquad \vdots$$

$$T_2 = \tau_{12_2} + 2 \sum_{K=1}^{1} (t_{1_k} + \tau_{14_k}) \quad (N-1)$$

$$T_1 = \tau_{12_1} \quad (N)$$

In summary, therefore, equalizer 11 has imparted average delays $T_1$ to $T_N$, respectively, to the frequency components in frequency bands 42–1 to 42–N of applied signal $V_{in}$ and, as is indicated in FIG. 3, the average delays so imparted are greater for the higher frequency components of $V_{in}$ than for the lower frequency components of $V_{in}$.

It should be pointed out, however, that the delays $T_1$ to $T_N$ are expressed as averaged delays and, therefore, do not represent the actual delays experienced by any particular one of the frequency components within the respective frequency bands 42–1 to 42–N. Hence, use of these delays to calculate the delay characteristic of the output signal $V_{out}$ extracted from output port 18 of equalizer 11 does not result in an exact replica of the characteristic. However, use of such delays does provide a substantially accurate characteristic, while it has resulted in greatly reducing the complexity of the description.

Figure 6:
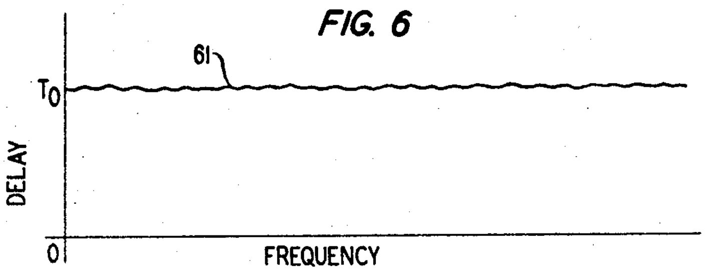
FIG. 6 illustrates the time delay characteristic of the signal of FIG. 4 after passage through the equalizer of FIG. 1.

In FIG. 6, a typical time delay characteristic 61, is illustrated. As shown, curve 61 is substantially uniform, indicating that all the components of $V_{out}$ have substantially the same delay. It should be noted that the degree of uniformity of curve 61 is dependent upon the number filters employed. In general, the greater the number of filters used, the more uniform the characteristic will be. Typically, however, for values of N>20, a substantially uniform characteristic can be achieved greater most conventional wideband microwave signals.

One further point to note is that the delays $t_{1_k}$ to $t_{1_N}$ and $t_{d_k}$ to $t_{d_N}$ of delay networks 13–1 to 13–(N-1) and 14–1 to 14–(N-1), respectively, can be calculated by use of equations 1 to N. Hence, one the number of filters to be employed in the equalizer is selected and the center frequencies and response characteristics of each of the filters chosen, both the averaged delays $T_1$ to $T_N$ required to appreciably equalize the delay characteristic of the input signal and the average delays in transmission between ports of the filter are defined. Solution of equations 1 to N for the delays required by networks 13 and 14 is then a straightforward process.

It is to be understood that the embodiment described herein is merely illustrative, and that numerous and varied other arrangements can readily be devised in accordance with the teachings of the present invention by those skilled in the art without departing from the spirit and scope of the invention. In particular, it is unnecessary that the delays introduced by the delay networks connecting adjacent directional filters be equal or that the directional filters have substantially equal Q's. Also, the passband characteristics of adjacent filters need not overlap at their half power points.

What is claimed is:

1. A microwave delay equalizer for selectively delaying the frequency components of a broadband microwave input signal having a prescribed delay distortion characteristic comprising:

a plurality of cascaded, four-port directional filters, each having a different center frequency, and each having two pairs of conjugate ports;

delay networks connecting one port of each pair of conjugate ports of each filter to a different port of a different pair of conjugate ports of the next adjacent filter in said cascade of filters;

each of said delay means introducing a prescribed average delay to compensate the delay distortion of said signal;

resistive means terminating the other ports of the last of said filters in said cascade of filters;

the other port of one of said pairs of ports of the first of said filters being the input port of said equalizer;

and the other port of the other of said pairs of ports of said first filter being the output port of said equalizer.

2. A microwave delay equalizer in accordance with claim 1 in which said delay networks are lengths of transmission lines.

3. A microwave delay equalizer in accordance with claim 1 in which said center frequencies and the response characteristics of said filters define a frequency band substantially equivalent to the frequency band of said wave energy.

4. A microwave delay equalizer in accordance with claim 3 in which the response characteristics of adjacent filters overlap at about their half power points.

5. A microwave delay equalizer for selectively delaying the frequency components of a broadband microwave signal comprising:

a network of directional filters;

characterized in that each of said filters has a different center frequency, and in that each is a four port having two pairs of conjugate ports, wherein wave energy coupled to one port of one pair of conjugate ports will divide, in some predescribed manner, between the other pair of conjugate ports with no wave energy being coupled to the conjugate of said one port;

a plurality of delay lines, where each delay line provides a different delay, and each connects one port of a conjugate pair of ports of the next adjacent filter in said network;

the remaining two ports of the last of said filters being match terminated;

and the remaining two ports of the first of said filters constituting the input and output ports of said delay equalizer.